United States Patent [19]
MacArthur et al.

[11] 3,838,422
[45] Sept. 24, 1974

[54] RADAR ADAPTIVE VIDEO PROCESSOR

[75] Inventors: John L. MacArthur; Barry E. Raff, both of Silver Spring, Md.

[73] Assignee: The United States of America as represented by the Secretary of the Navy, Washington, D.C.

[22] Filed: Sept. 20, 1973

[21] Appl. No.: 399,030

[52] U.S. Cl............. 343/7 A, 343/5 DP, 343/5 SM
[51] Int. Cl............................................... G01s 9/02
[58] Field of Search................ 343/5 DP, 5 SM, 7 A

[56] References Cited
UNITED STATES PATENTS

| | | | |
|---|---|---|---|
| 3,374,479 | 3/1968 | Moore | 343/7 A |
| 3,778,822 | 12/1973 | Bauer | 343/7 A |
| 3,778,825 | 12/1973 | Ares | 343/7 A |

*Primary Examiner*—Malcolm F. Hubler

[57] ABSTRACT

Adaptive thresholding is provided to enhance target detections in the presence of clutter. A closed loop feedback system functions to maintain an average constant false alarm probability within three range intervals. Radar video signals are sampled, then compared with a thresholding signal comprised of a constant plus the feedback signal. Average constant false alarm probability is maintained by forcing the signal to a constant duty factor by use of pulse stretching. The feedback signal is filtered over the range intervals to adjust for range variations in clutter density.

14 Claims, 7 Drawing Figures

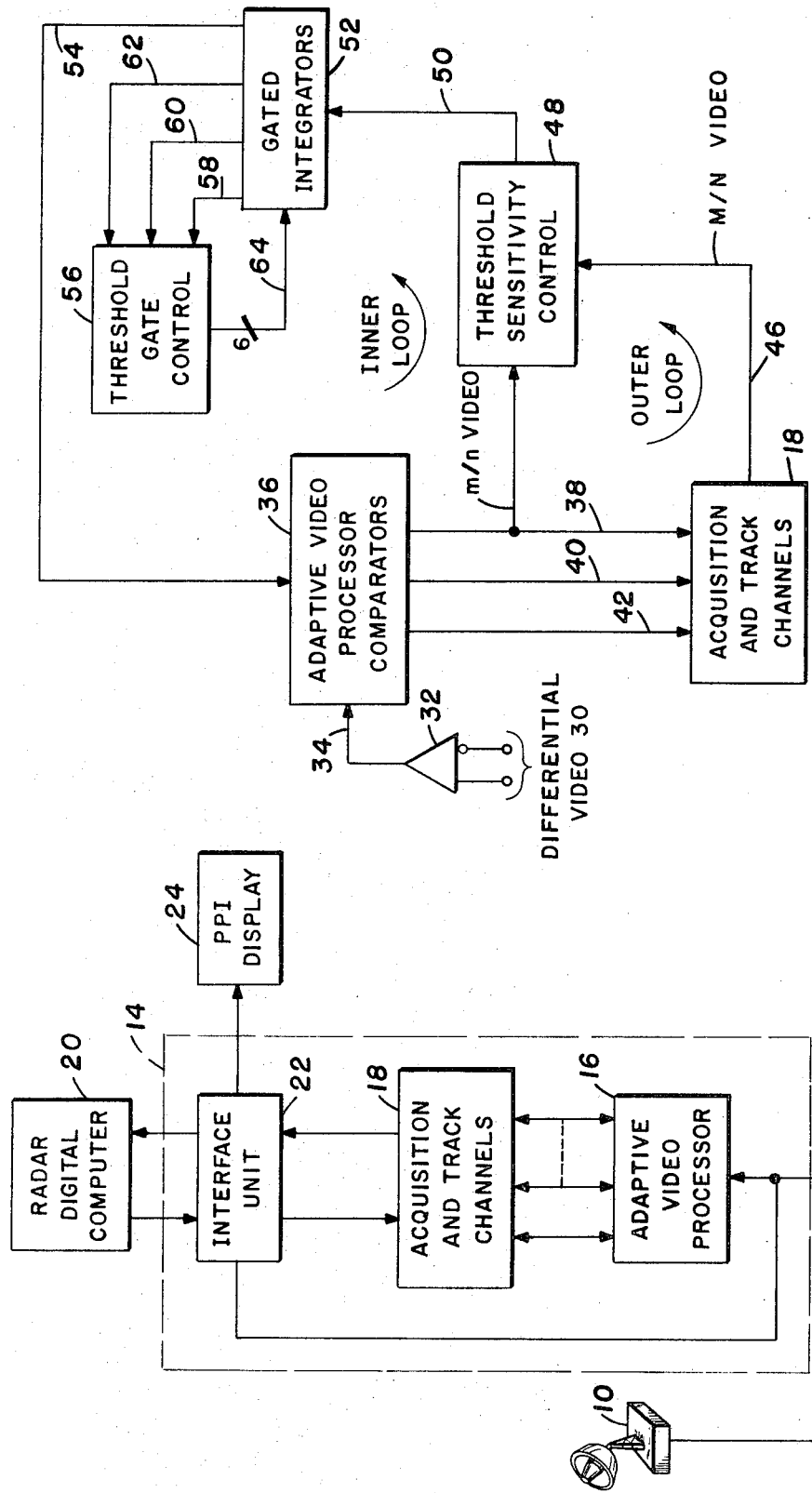

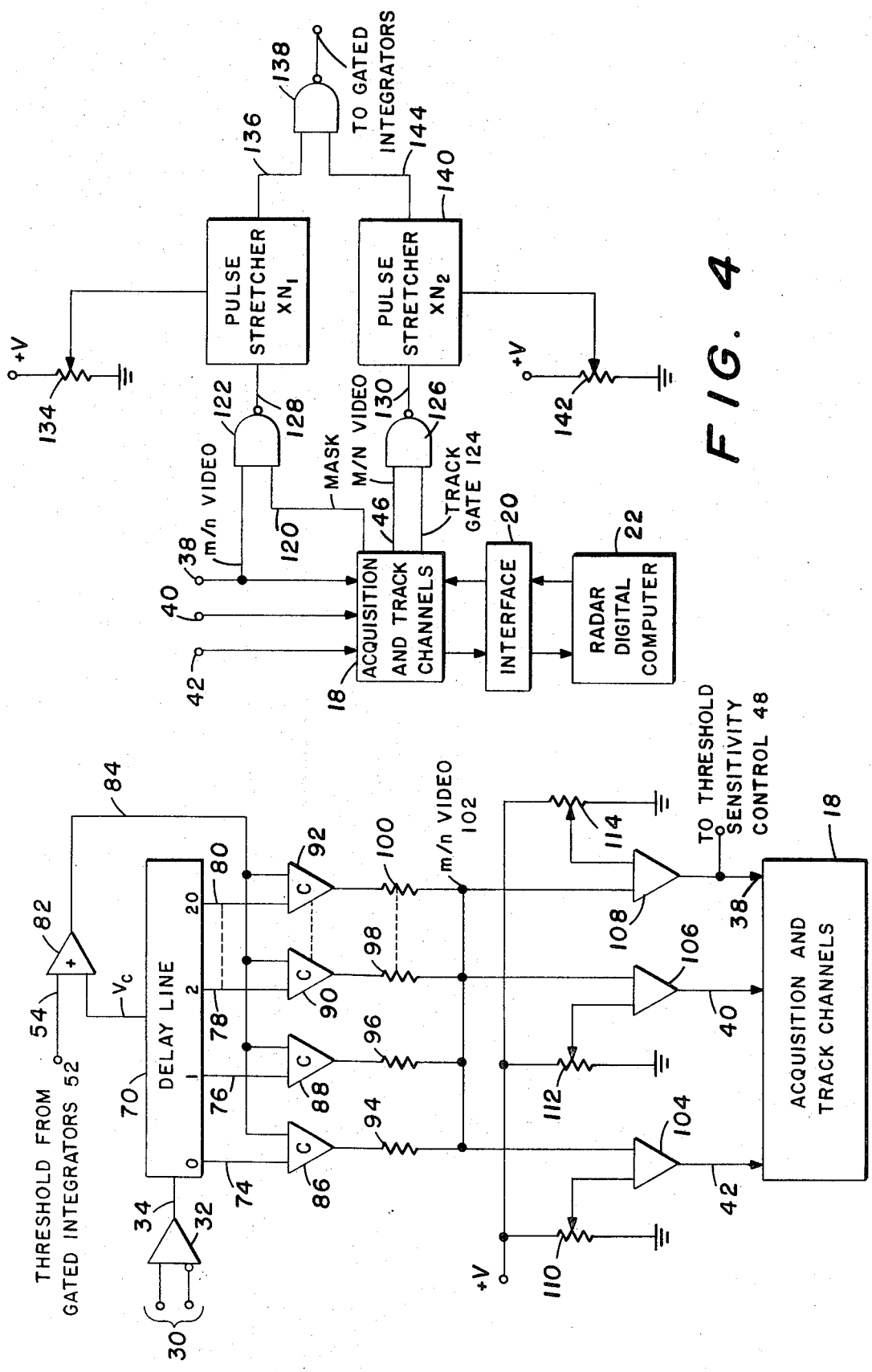

RADAR ADAPTIVE VIDEO PROCESSOR

BACKGROUND OF THE INVENTION

The present invention relates generally to radar systems and more particularly to radar systems having a video processor maintaining an adaptive threshold level which permits target detection in the presence of clutter.

Clutter is only one of many phenomena which may produce unwanted radar echoes or otherwise destroy or degrade radar target information. Generally, clutter is loosely defined as any conglomeration of undesired radar echoes. These echoes may be produced by reflections from vegetation, hills, the surface of the sea, or from meteorological phenomena such as clouds or rain. Clutter differs from the other serious limitation on radar performance, receiver noise, principally in that receiver noise is not a function of radar beam range. Also, there is usually no correlation in receiver noise between successive radar pulses, such as there often is with clutter. Since these unwanted radar echoes may be very extensive and may effectively mask desired targets, a great deal of effort has been expended in attempting to obtain effective radar performance in the presence of clutter. Various techniques have been proposed, and are presently in use, to minimize the influence of clutter. Two examples might be: specialized filtering of the return signal; and signal correlation or matching of the return signal to a predetermined model. Another method used to reduce the effects of clutter is sensitivity time control, this provides a programmed variation in receiver gain over an individual range sweep, thereby blocking the unwanted echoes from the receiver. Of course, a simple clutter rejection system would be to provide the radar receiver with a manually operated gain control and to utilize a trained radar operator to vary the receiver gain to adjust for whatever varying degrees of clutter may be present.

These clutter rejection systems have generally suffered from the inability to respond to variations in signal strengths, both from the target return and the undesired signal caused by the clutter. Merely setting a threshold level and requiring targets to exceed that level will necessarily result in the loss of some desired targets. Programming filters to achieve sensitivity time control and signal correlation techniques using memories to retain a model of an ideal signal are both cumbersome and complex and, moreover, they still do not adequately provide for variations in signal strength.

SUMMARY OF THE INVENTION

It is therefore an object of this invention to provide a simple adaptive threshold clutter rejection system for use in a radar system.

It is another object of this invention to provide a clutter rejection system which allows all targets to be detected in the presence of clutter.

It is another object of this invention to provide an adaptive clutter rejection threshold located in a radar video processor and utilizing feedback loops to maintain the threshold at the optimum level.

It is a still further object of this invention to provide an adaptive threshold in a radar video processor for maintaining a constant average probability of false alarm by use of pulse stretching techniques and range gating.

In one embodiment of the invention the adaptive video processor is shown as an element in a radar video preprocessor. Such preprocessors are found in most radar systems and serve to process the radar video signals from a radar receiver into a form acceptable to a general purpose digital computer. It is now almost universal practice to use a digital computer as a memory as well as for solving the necessary target tracking equations. The digital computer functions to allow a record to be made of the return signals while also providing a real time display signal.

The adaptive video processor (AVP) of the invention incorporates "$m/n$" threshold detection and slow loop feedback to permit constant false alarm rate operation. The AVP system consists of various functional modules connected in a closed loop arrangement. These modules function to maintain an average constant false alarm rate probability within three radar range intervals and within selected bearing sectors. The three range intervals involved are normally denoted as log-normal, transitional, and Rayleigh. The function modules could be labelled generally as; AVP comparators, sensitivity control, gated integrators, and threshold gate control. These modules form a closed loop feedback which might be termed an "inner loop." Detection information signals from another part of the radar video processor (RVP) will also affect the AVP false alarm probability. These signals, when fed back to the AVP, will form an "outer loop."

The adaptive video processor accepts differential video from the radar receiver, converts it to unipolar video and then buffers it. The signal is then fed into the AVP comparators section where it drives a conventional delay line video storage element approximately 2 microseconds in length. This delay line is tapped every one-tenth microsecond to obtain 20 video samples; one-half of these samples will lie on either side of a center tap of the delay line. The 20 samples will be compared to the center tap voltage to determine the number of delay tap signals which exceed the center tap voltage by a threshold constant. This constant is a feedback derived signal and is added to the center tap voltage prior to the comparison. Since the signals are logarithmic video, the addition of the threshold constant is equivalent to a multiplication factor of the received video. One method of performing this comparison would be to use individual comparators. Since comparators have only two output states, high or low, upon summation of these 20 outputs there are possible only 21 discrete levels. The summation of these comparator outputs is referred to as "$m/n$" video. It may now be seen that by controlling the value of the threshold constant, it is possible to control the percentage of time that the "$m/n$" video actually exceeds any one of the 21 possible levels. If we arbitrarily pick this level at 10, then whenever the "$m/n$" video exceeds the tenth level a target detection is generated and fed to an AVP acquisition channel. The relative frequency of these detections will be sensed by the feedback loop and held constant. By using analog comparators and adjustable threshold constants the "$m/n$" video is set to three threshold levels which form two track channels and one acquisition channel. The acquisition channel comparator output signal is monitored by the inner loop in order to maintain a constant probability of false alarm. The outer loop monitors the acquisition detections in relation to a pulse repetition frequency "M/N" detection criterion, for N consecutive radar dwells. In this embodiment M is chosen as 4 and N as 6.

The sensitivity control module accepts "m/n" video detections from the acquisition channel comparator and also the radar video preprocessor acquisition channel output. These two signals represent the inner and outer loops respectively. The utility of these two loops will soon be explained. The sensitivity control module establishes the overall system false alarm rate using pulse stretching techniques. The remainder of the loop following the sensitivity control attempts to maintain the average false alarm rate at the output of the sensitivity control at a fixed level, in this case such level is set at 5 percent. Stretching the "m/n" pulses by a factor $N_1$, inversely lowers the sensitivity control average input duty factor ("m/n" detection rate) by $N_1$. It can then be seen that the combined (inner and outer loop) input "m/n" detection rate, in a stable condition, is given by:

$$(PFA_{m/n})N_1 + (PFA_{M/N})N_2 = 0.05 \qquad (1)$$

where, PFA denotes probability of false alarm, $N_1$ denotes the multiplicative stretch factor for the output of the "m/n" acquisition channel comparator, and $N_2$ denotes the multiplicative stretch factor for the output of the "M/N" radar video preprocessor (RVP) acquisition channel. The selection of stretch factors may be made under operator control or automatically by appropriately programming the radar digital computer.

The output signal of the sensitivity control, which has been forced to a constant average duty factor of 5 percent, is fed to the gated integrators module. The gated integrators sense the average duty factor and generate a threshold feedback signal to the delay line of the AVP comparators module. This signal is fed into an amplifier along with the delay line center tap, with the resultant signal being the voltage against which the twenty delay line taps are compared. Raising this threshold feedback signal lowers the "m/n" video average duty factor (or voltage), and lowering it raises the duty factor. The "m/n" duty factor is sensed by the gated integrators by first shifting the sensitivity control output to form a bipolar signal. The amount of the voltage shift is adjusted such that the average voltage is zero when the duty factor is 5 percent. This signal is then filtered producing a filter output voltage proportional to the average input signal voltage. Any change in the average duty factor will produce an error voltage at the filter output, thereby providing a slow loop corrective threshold change. The gated integrators actually consist of three such filters, each section handles the threshold control for a different range interval. These three intervals correspond to the previously mentioned three intervals and can now be more accurately denoted. The short range interval may be thought of as clutter limited, and the long range interval as receiver noise limited, while the medium range may again be thought of as simply the transition area. The appropriate filter section is activated only during its appropriate range interval by the selective use of gates. These gates are controlled by another function module called a threshold gate control. The three filter outputs after being gated are then summed to form the signal which will be fed back to the AVP comparators.

The threshold gate control is used to sense the three ungated range thresholds denoted as, short, medium and long, $T_S$, $T_M$, and $T_L$. Since the range over which sea clutter predominates will vary with sea state, provision is made to adjust the timing of the gates automatically. The medium range gate will be of fixed duration, whereas the short range gate will be from range zero to the edge of the medium range and the long range gate will last from the end of the medium gate to the maximum operating range. The gates are positioned by integrating the difference voltage given by the expression: $(\frac{1}{2})(T_S + T_L) - T_M$. The effect of this operation will be to drive the medium gate in range until it straddles the transition line between short range correlated clutter and long range receiver noise.

With regard to the utilization of the two feedback loops; the inner loop is derived directly from the acquisition threshold output while the outer loop is derived from the synthetic video output of the preprocessor acquisition channel. The latter is video which has passed an "M/N" detection criterion. The inner loop signal is of course a threshold detection, and the pulses are first stretched to $N_1\tau$ prior to being fed to the gated integrators; $\tau$ is equal to the radar pulse width. If the inner loop is operating with the outer loop disconnected the video will be driven to a 5 percent duty cycle, therefore the detection probability at the threshold output will be 5 percent divided by $N_1$. If $N_1 = 1$, i.e., no pulse stretching is accomplished, then the detection probability will be 5 percent, determined solely by the asymmetry of the AVP comparators (the delay line). As $N_1$ is increased the detection probability will decrease accordingly. Turning now to the outer loop, with an input probability of 5 percent the RVP acquisition channel output probability for M/N = 4/6 will be $8.64 \times 10^{-5}$. This figure is obtained by use of the binominal distribution $$\sum_{s=r}^{n} \binom{n}{s} P^s q^{n-s} \qquad (2)$$

In this case the values used are $n = 6$, $r = 4$, and $P = 1 - q = 0.05$. This result is obtained assuming uncorrelated hits from pulse to pulse, as would be the case for receiver noise. These hits will also be stretched, but until the factor $N_2$ approaches 1,000, the outer loop will not contribute significantly to the detections at the output of the sensitivity control. The outer loop is included to automatically place an upper bound on $P_n$ (the output probability) at a level suitable for automatic processing, for example, if it is desired to hold $P_n$ to a maximum of $10^{-3}$ then $N_2 = .05/.001 = 50$.

THE DRAWINGS

FIG. 1 is a simplified block diagram of a typical radar system utilizing the present invention.

FIG. 2 is a simplified block diagram of the present invention.

FIG. 3 is a schematic diagram of an adaptive video processor comparator network.

FIG. 4 is a schematic diagram of a typical sensitivity control used in the present invention.

DETAILED DESCRIPTION OF THE ILLUSTRATIVE EMBODIMENTS

Figure 5:
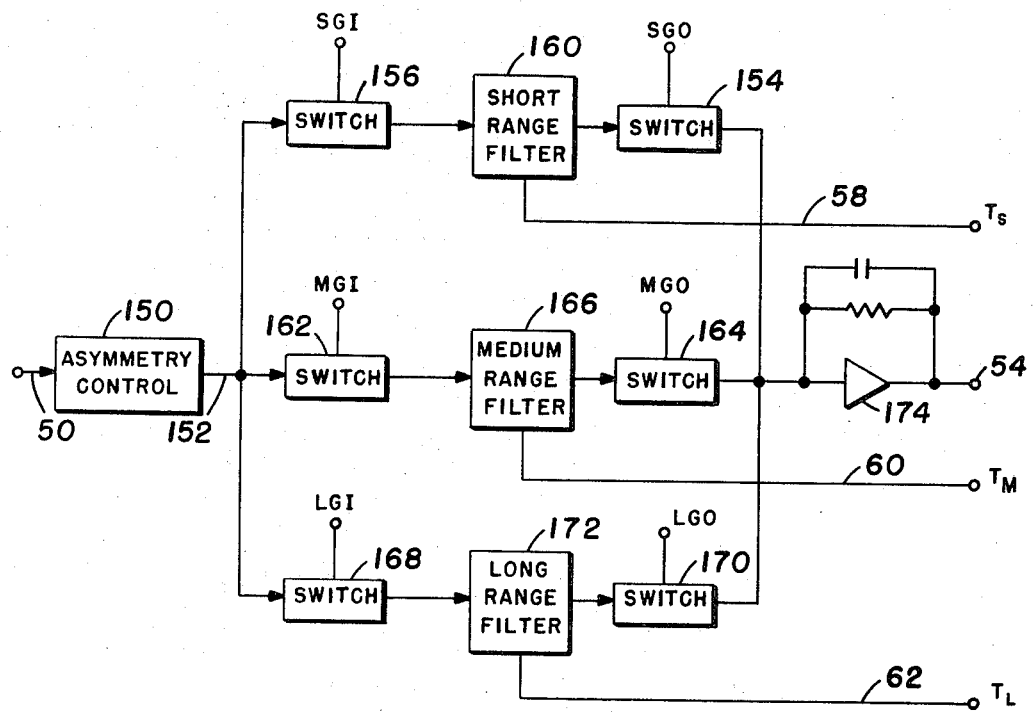
FIG. 5 is a schematic diagram of a typical gated integrator used in the present invention.

Referring now to FIG. 1, a typical radar system is shown having an antenna 10 to transmit and receive radar signals. A typical radar receiver 12 will receive radar pulses reflected both from desired targets and from the environment. In an automatic radar system the received signals are first sent into a radar video preprocessor so that the signals may be placed in proper form for a digital radar computer to analyze the received signals. The signals received by the radar receiver 12 are fed to a radar video preprocessor 14 where the adaptive video processor 16 sets the detection threshold level and hence determines the false alarm probability. Once a target has been detected the signals are fed into an acquisition and track channel unit 18 where the signals are arranged prior to being analyzed by a digital computer 20. Because it is economical to use commercially available equipment, an interface unit 22 is required to allow a smooth transfer of data from the radar video preprocessor to a conventional, general purpose digital computer 20. The interface unit 22 may also be used to drive various readout or output display apparatus, such as a PPI display 24. The present invention relates to an improved adaptive video processor 16.

Referring now to FIG. 2; differential video signals 30 from a radar receiver are converted to unipolar video by an operational amplifier 32 operating with inverting and non-inverting inputs. The desired video signal 34, which appears at the output of the operational amplifier 32, has positive sense and is fed into the adaptive video processor comparators 36. This comparator network, which will be explained in more detail later, uses analog comparators to produce an "$m/n$" video signal. This signal is passed through three analog comparators to threshold the "$m/n$" video and generate an acquisition channel detection signal 38 and two track channel detection signals 40 and 42. These three signals 38, 40, and 42 are fed to an acquisition and track channel module 18 which could be of the conventional type. This module 18 performs a pulse repetition frequency M/N detection criterion on the acquisition channel signal 38 for N consecutive radar dwells, producing an M/N video signal 46 which is fed to a threshold sensitivity control 48. The "$m/n$" video 38 is also fed to the threshold sensitivity control 48, which will be explained in more detail later. The sensitivity control 48 establishes the overall system false alarm rate by using pulse stretching techniques, and produces an output signal 50 which has been forced to a constant average false alarm rate. This output signal 50 is fed to gated integrators 52 which sense the average duty factor (of signal 50) and produce a feedback signal 54 to the adaptive video processor comparators 36 when the duty factor level departs from the present level. The gated integrators 52 are actually comprised of three stages, corresponding to the three range intervals previously discussed, the appropriate range interval is selected by a threshold gate control circuit 56. The threshold gate control 56 is fed signals 58, 60, and 62 from the three stages of the gated integrator 52 and produces appropriate range gate signals which are fed back to the gated integrators 20 on a multichannel line 64. The threshold gate control 56 acts to position the transition range interval so that it overlaps the end of the short range and the beginning of long range, as discussed previously.

Referring now to FIG. 3 which shows the adaptive video processor comparators (36 of FIG. 2) in more detail. The predominant functions of this subsystem are to generate the acquisition and track channel detections 38, 40, and 42 which are fed to the acquisition and track channels 18, and to provide for automatic control of average false alarm rate by combining the delay line center tap voltage $V_c$ with the threshold voltage 54. Upon converting the differential radar video 30 to a unipolar (positive) video signal 34, this signal 34 is fed to a conventional delay line 70. The delay line 70 utilized in the instant embodiment is a time storage element 2 microseconds in length, and is tapped every 100 nanoseconds to obtain 20 video samples about a center tap denoted as $V_c$. These 20 video samples are shown in part as signals 74, 76, 78 and 80 and are used to determine the instantaneous number of delayed video samples which are exceeded by $V_c$ plus the threshold voltage 54 from the gated integrators 52. The center tap voltage $V_c$ and the threshold signal 54 are used to drive a summing amplifier 82 producing an output signal 84 therefrom. The comparison of the delayed video signals 74, 76, 78, 80 and the center tap plus threshold signal 84 is made by using analog comparators, which are shown in part as 86, 88, 90 and 92. An output signal from this type of comparator can assume only one of two states, "one" or "zero", i.e., either signal 84 exceeds the delayed video samples 74, 76, 78, 80, or it does not. These bilevel comparator outputs are summed through a resistor summing network shown in part by resistors 94, 96, 98, 100. The resultant summed voltage appearing on bus 102 may then assume only one of twenty-one possible states, representing the number of "ones" appearing at the comparators 86, 88, 90, 92 outputs. The analog signal appearing on bus 102 is referred to as "$m/n$" video. Three additional comparators 104, 106 and 108 are used to threshold the "$m/n$" video at fixed levels. These levels are set by potentiometers 110, 112, and 114 but they are not permanent and may be adjusted as the system requires. Comparator 108 thresholds the "$m/n$" video at the tenth "$m/n$" level generating the acquisition channel video. This signal is used by the radar video processor to generate a synthetic video for display purpose, say, on a PPI display, 24 of FIG. 1. The adaptive video processor is, in this embodiment, intended to hold acquisition video at an average constant false alarm rate or duty factor equal to 5 percent. This means that the threshold signal 54 into the summing amplifier 82 is adjusted such that on the average, ten or more delay line taps 74, 76, 78, 80 etc., are exceeded by the center tap voltage 72 plus threshold signal 54 only 5 percent of the allowed time. The potentiometers 110 and 112 which are used to threshold the track channels are set empirically according to environmental conditions.

Referring now to FIG. 4, which shows the threshold sensitivity control (48 of FIG. 2) in more detail, this subsystem establishes the absolute system detection sensitivity. The sensitivity control has two video inputs; the adaptive video processor acquisition channel comparator video 38, and the radar video preprocessor acquisition channel synthetic video 46. These two video signals are intimately related due to the fact that the RVP acquisition channel output is actually the AVP acquisition channel video processed under a M/N correlation criterion, in this embodiment M equals 4 and N equals 6. The AVP acquisition signal 38 is gated with a mask signal 120 in an appropriate gating device 122. This mask signal 120 operates similarly to a conventional range gate signal and is used as a geographical mask; in the case where the radar antenna is on land but the area of interest is at sea the mask signal would inhibit any radar return signals caused by land clutter. In the present embodiment the geographical mask signal 120 is generated in the RVP. The RVP acquisition signal 46 is gated with a track gate signal 124 in an appropriate gating device 126. The track gate signal 124 is a digital signal, already time aligned with the synthetic video signal 46. This signal represents the computed track gate, as calculated by the radar digital computer 22, which will fall on either side of the predicted target position. The synthetic video signal 46 is gated by the track gate signal 124 so that only ungated targets, i.e., those not in track, can enter the sensitivity control unit 48 and affect the system sensitivity. The output signal 128 from gate 122 is then fed to a pulse stretching unit 132, which acts to stretch the input pulses by a factor $N_1$. This pulse stretching is required, as mentioned earlier, since the false alarm probability will be inversely proportional to the pulse width stretch factor. The pulse stretch subsystem 132 may be comprised of any of the well-known types of pulse stretching schemes, such as an edge triggered monostable multivibrator. Regardless of the pulse stretching scheme employed it is desired to retain control over the stretch factor $N_1$ by some means which may be shown as a variable resistor 134. The output signal 136 from the "m/n" video pulse stretcher 132 is fed to a gate device 138. Similarly the M/N video signal 130 is pulse stretched by a pulse stretch module 140 whose stretch factor $N_2$ is set by variable resistor 142. The stretch factors $N_1$ and $N_2$ will not necessarily be equal and, in fact, $N_2$ will generally be much greater than $N_1$ due to the lesser degree of influence the outer loop has over the system. The output signal 144 from the M/N video pulse stretcher 140 is also fed to the gate device 138, thereby producing an output signal 50, having a constant duty factor, to be fed to the gated integrators (52 of FIG. 2).

With reference to FIG. 5, which shows the gated integrators (52 of FIG. 2) in greater detail, the gated integrators, which develop the analog voltages fed back to the AVP comparators, are actually three high gain filters controlling the integrator video average duty factor. The output signal 50 of the threshold sensitivity control (48 in FIG. 2) consists of TTL level pulses. This signal 50 is fed into an asymmetry control 150, which operates to make signal 50 asymmetrical about the zero axis. This symmetry control may be one of the conventional well-known types. The asymmetry ratio of the asymmetry control 150 is adjusted such that when the input signal 50 has an average duty factor of 5 percent the average output signal 152 equals zero. This will occur when the input signal 50 positive to negative voltage ratio is 19:1. The origin of this ratio may be easily seen from the expression:

$$\frac{1 \text{ Hit}}{20 \text{ opportunities}} = \frac{1 \text{ Hit}}{1 \text{ Hit} + 19 \text{ Misses}} = 5\% \quad (3)$$

The three high-gain filter sections cover the short, medium, and long range intervals, the appropriate filter is selected by switches which are controlled by the threshold gate control (56 of FIG. 2) which will be explained in more detail later. The switching sequence and filter operation is as follows. During the radar dead time a filter output analog switch 154 is closed, approximately 1 microsecond after range zero a filter input analog switch 156 is closed and the asymmetric video signal 152 is allowed to charge a capacitor in series with a resistor, which are located inside the filter and will be shown in more detail in FIG. 6. The charge on this capacitor will hence affect the output threshold voltage of filter 160 which is connected through already closed switch 154. At the end of the short range gating period, as determined by the threshold gate control 56, the short filter switches 156 and 154 are opened and the medium filter switches 162 and 164 are closed, thereby transferring control of the threshold voltage to the medium range filter 166. Similarly, at the end of the medium range gating period medium filter switches 162 and 164 are opened and long filter switches 168 and 170 are closed, thereby transferring control of the threshold voltage to the long range filter 172. Switches 168 and 170 will remain closed until the end of the radar live time when the long range switches 168, 170 will be opened. Short range switch 154 will then be closed and remain closed during radar dead time until zero range again indicates the start of another cycle. The outputs of the three range filters 160, 166, 172 are connected through their respective output switches 154, 164, 170 to an operational amplifier 174 which inverts and buffers the filtered asymmetrical video 54. It should be noted that only one output analog switch 154, 164, 170 is enabled at any one time. The output signal 54 of amplifier 174 is fed back to the summing amplifier (82 in FIG. 3) located in the adaptive video processor comparators.

Figure 6:
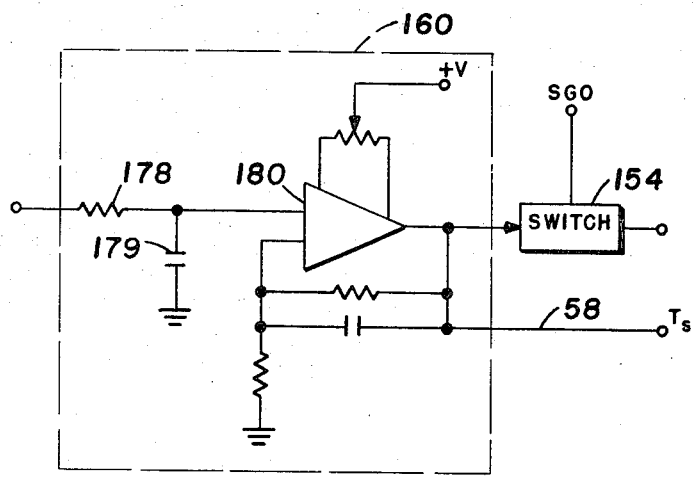
FIG. 6 is a schematic diagram of a conventional filter used in one embodiment of the present invention.

One of the range filters (160, 166, 172 of FIG. 5) is shown in FIG. 6 and is shown as the short range filter 160. One such filter is located in each of the three range branches of FIG. 5. The filter consists primarily of a resistor 178 and a capacitor 179 with an operational amplifier 180 included to set the overall loop gain. Each amplifier located in the three range filters 160, 166, 172 has the same gain. The output signal of the operational amplifier 180 is also used as an input signal 58 to the threshold gate control, 56 in FIG. 2. This input signal 58 might be called the short threshold and labelled $T_S$.

Figure 7:
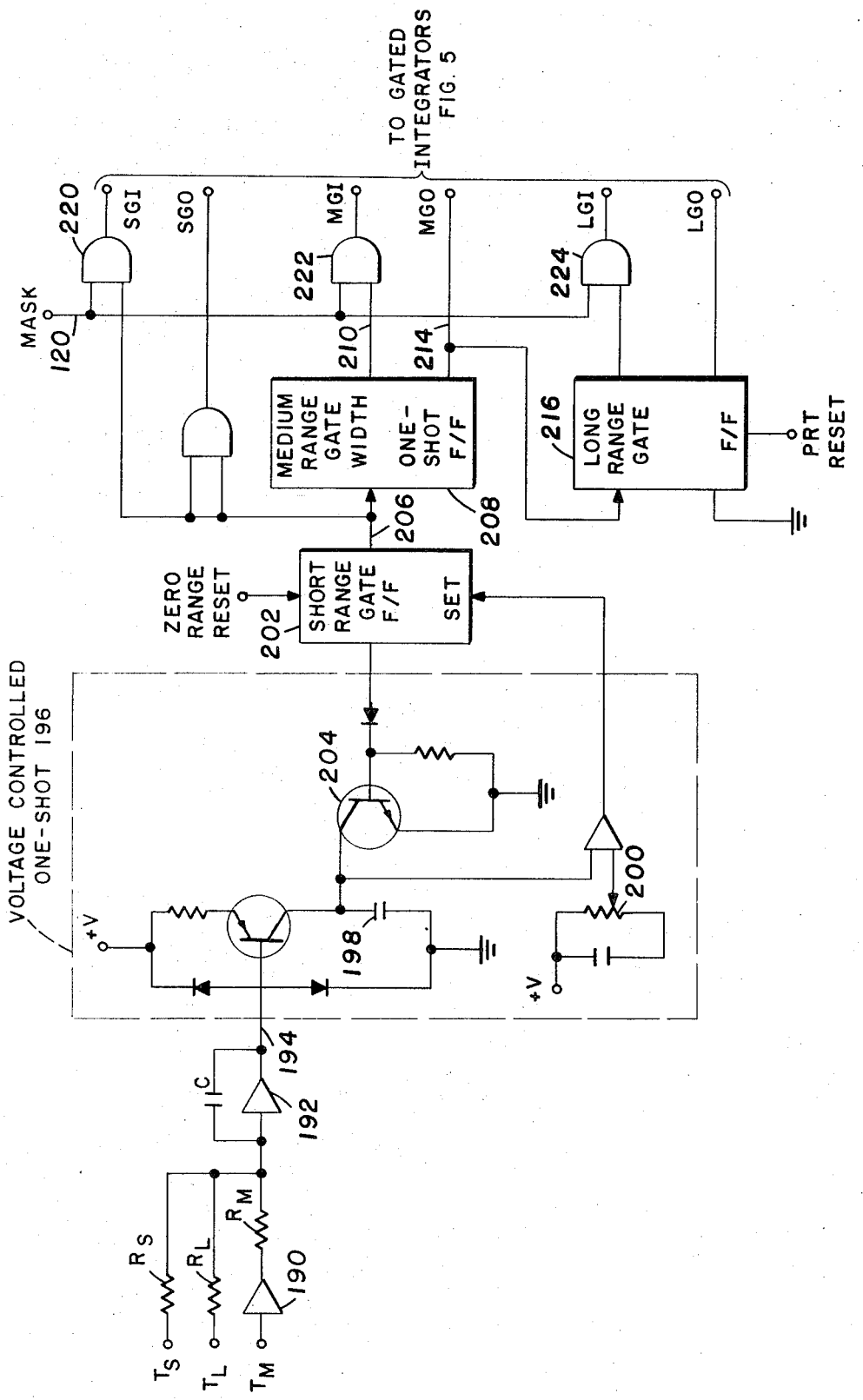
FIG. 7 is a schematic diagram of a typical threshold gate control used in the present invention.

The threshold gate control is shown in FIG. 7, and as stated previously serves to determine the active range positions and the durations of the gated integrator input/output signals. The gated integrators require six enable gate signals, short gate input/output SGI, SGO; medium gate input/output MGI, MGO; and long gate input/output LGI, LGO. Moving the medium gate in range causes the medium gated integrator or filter to sense different video distribution parameters, causing the resulting threshold to adjust accordingly. This middle gate is of a fixed width, typically 20 microseconds, and only its position is varied. The threshold gate control is intended to position the medium gate so as to null the expression: $T_M - \frac{1}{2}(T_L - T_S)$. The three threshold signals $T_S$, $T_M$, $T_L$, are taken from the gated integrators, 154, 166, 172 of FIG. 5, before being integrated by integrator 174 of FIG. 5 and hence are not interrupted. The threshold signal $T_M$ is inverted by inverter 190 and fed through resistor $R_M$ before being fed to a conventional integrator 192. The integration time constant of the integrator 192 will be determined largely by capacitor C. The two remaining threshold voltages $T_S$ and $T_L$ are fed to integrator 192 respectively through resistors $R_S$ and $R_L$. The resultant output signal 194 of integrator 192 may be given by the expression:

$$(1/R_M C)\int T_M dt - (1/R_L C)\int T_L dt - (1/R_S C)\int T_S dt \quad (4)$$

The time variation of the output signal 194 of integrator 192 will be zero when:

$$k(-T_L - T_S + 2T_M) = 0 \quad (5)$$

The position of the middle range gate is determined by controlling the length of the short range gate, not by directly controlling the middle range gate width. The short range gate width is determined by a conventional voltage controlled one-shot 196. This one-shot 196 operates in the normal manner and triggering may be looked at as a function of the relationship between capacitor 198 and variable resistor 200. That is, when the charge on capacitor 198 exceeds the threshold determined by variable resistor 200, a short range gate flip-flop 202 is set, thereby dumping the charge on the capacitor 198 through a transistor 204. Since the output signal 206 of the short range gate flip-flop 202 is used for the short range gate it will terminate with the threshold crossing of the capacitor 198. Note that the current level of signal 194 into the voltage controlled one-shot 196 which charges capacitor 198 is determined by the integrator 192. Hence, the short gate width and the position of the medium gate depends upon the integrator 192 voltage. The termination of the short gate, which would be indicated by the trailing edge of output signal 206 of flip-flop 202 triggers a one-shot multivibrator 208; this one-shot generates the middle gate input signal 210. Since the middle gate width is fixed, an internal time delay will reset the one-shot 208 producing the medium gate output signal 214. Similarly, the trailing edge of output signal 214 of one-shot 208, which indicates the end of the medium gate, triggers a flip-flop 216 which generates the long gate signal. Flip-flop 216 remains set until the end of the radar pulse repetition time when it is reset. This threshold gate control system has then generated the required six signals for the gated integrators, three active input signals SGI, MGI, and LGI and three output signals SGO, MGO and LGO. The three input signals SGI, MGI, LGI, may be interrupted by the geographical mask signal 120 of FIG. 4 which will prevent influence caused by unwanted land clutter signals. This geographical masking may be accomplished through conventional gating devices 220, 222, and 224.

Various other modifications, adaptations, and alterations are of course possible in light of the above teachings. It should therefore be understood at this time that within the scope of the appended claims the invention may be practiced otherwise than is specifically described hereinabove.

What is claimed is:

1. An adaptive radar video signal processor of a closed loop type wherein a feedback signal is produced for maintaining a constant average false alarm probability within selected range intervals and comprising:
    sampling means connected to receive said radar video signal for producing a plurality of samples of said video signal,
    a plurality of comparator means connected to receive said samples and said feedback signal for comparing each sample with said feedback signal and producing a distinct output signal for each video sample which exceeds said feedback signal level,
    summing means connected to receive said comparator means output signals and producing an output signal having a level proportional to the number of output signals produced by said plurality of comparator means,
    thresholding means connected to receive the output signal of said summing means for producing an output signal when said summing means output signal exceeds a preselected level,
    duty factor controlling means connected to receive said output signal from said thresholding means and producing an output signal therefrom having a predetermined duty factor,
    a plurality of selectively operable filter means each having an input connected to receive said output signal of the duty factor controlling means and producing signals proportional to the duty factor of said input signal, upon being combined said proportional signals constituting said feedback signal connected to said comparator means, and
    gate control means for selectively operating said filter means in response to said selected range intervals.

2. The apparatus of claim 1 wherein said sampling means comprises a multi-tapped delay line.

3. The apparatus of claim 2 wherein said duty factor controlling means comprises a pulse stretcher for producing pulses stretched by a predetermined factor.

4. The apparatus of claim 3 wherein said gate control means comprises
    a plurality of astable multivibrator means connected in cascade, each producing a pulse having a length corresponding to a preselected range interval,
    wherein a first of said astable multivibrator means is triggered upon radar range being equal to zero.

5. The apparatus of claim 4 wherein said predetermined duty factor equals 5 percent.

6. The apparatus of claim 5 wherein said thresholding means comprises an analog comparator in combination with a potentiometer having a preselected value.

7. A radar video signal processor including an acquisition detector producing a signal when a preselected ratio of hits per radar dwells is exceeded indicating correlation and also including an adaptive radar vido processor of a closed loop type wherein a feedback signal is produced for maintaining a constant average false alarm probability within selected range intervals, said adaptive radar video processor comprising,
    sampling means receiving said radar video signal and producing a plurality of samples therefrom,
    a plurality of comparator means connected to receive said samples with said feedback signal and producing a distinct output signal for each video sample which exceeds said feedback signal level,
    summing means receiving said comparator means output signals and producing an output signal having a level proportional to the number of samples exceeding said feedback signal, a plurality of thresholding means each having a different preselected threshold level and each receiving said output signal from said summing means for producing output signals when said threshold levels are exceeded, said acquisition detector connected to receive a first of said output signals from the plurality of threshold means and producing said correlated output signal, first duty factor controlling means receiving a second output signal from said thresholding means and producing a signal therefrom having a predetermined duty factor, second duty factor controlling means receiving said correlated output signal and producing a signal having a predetermined duty factor, means receiving said first and second controlled duty factor signals for producing a combined signal therefrom, a plurality of selectively operable filter means receiving said combined signal for producing signals proportional to the duty factor of said combined signal, said filter means output signals being fed back to said comparator means, and a plurality of gate control means connected to said filter means for selectively operating said plurality of filter means in response to selected range intervals.

8. The apparatus of claim 7 wherein said sampling means comprises a tapped delay line.

9. The apparatus of claim 8 wherein said thresholding means comprise analog comparators each in combination with a variable resistor means.

10. The apparatus of claim 9 wherein said first and second duty factor controlling means comprise first and second pulse stretching means having a first and second pulse stretch factor.

11. An adaptive video signal processor of a closed loop type wherein a feedback signal is produced for maintaining a constant average false alarm probability within selected range intervals and comprising, sampling means connected to receive said radar video signal and producing a plurality of samples therefrom, a plurality of comparator means each receiving an associated one of said plurality of signal samples and said feedback signal for producing an output signal when said associated sample exceeds said feedback signal, summing means connected to receive said output signals from said plurality of comparator means and producing an output signal of a level proportional to the number of comparator means output signals, thresholding means connected to receive said summing means output signal and producing an output signal when said summing means output signal exceeds a preselected level, means connected to receive said output signal from the thresholding means for maintaining the duty factor of said output signal from the thresholding means at a preselected level, a plurality of filter means selectively operable over preselected radar range intervals receiving said maintained duty factor signal, each filter means producing an output signal, said filter means output signals being combined to form said feedback signal and connected to said plurality of comparator means, and gating means for enabling selectively said filter means in response to preselected radar range intervals.

12. The apparatus of claim 11 wherein said sampling means comprises a signal delay line producing a plurality of time delayed signals.

13. The apparatus of claim 12 wherein said duty factor maintaining means comprises a pulse stretching device of the multivibrator type.

14. The apparatus of claim 14 further including a pulse repetition frequency M/N detection means connected to receive said output signals from said thresholding means and producing a pulse repetition frequency correlation signal therefrom, second means for maintaining a preselected duty factor connected to receive said M/N correlation signal, and summing means receiving said first and second duty factor maintaining means output signals and producing an output signal therefrom connected to said filter means.

* * * * *